Feb. 21, 1950 J. B. KOCH 2,498,126
MOTOR SUPPORT
Filed July 16, 1946 2 Sheets-Sheet 1

INVENTOR
JOHN BRANDT KOCH
BY
Toulmin & Toulmin
ATTORNEYS

Feb. 21, 1950 J. B. KOCH 2,498,126
MOTOR SUPPORT
Filed July 16, 1946 2 Sheets-Sheet 2

INVENTOR
JOHN BRANDT KOCH
BY
Toulmin & Toulmin
ATTORNEYS

Patented Feb. 21, 1950

2,498,126

UNITED STATES PATENT OFFICE 2,498,126

MOTOR SUPPORT

John B. Koch, Detroit, Mich., assignor to American Blower Corporation, Detroit, Mich., a corporation of Michigan Application July 16, 1946, Serial No. 683,848

18 Claims. (Cl. 248—26)

This invention relates to means for resiliently supporting a motor in a fixed position.

An object of the invention is to provide an improved motor support of the type wherein a resilient ring is provided around each end of a motor and the resilient ring is fastened in a rigid mounting.

Another object of the invention is to provide an improved mounting member for a resilient motor supporting ring wherein the mounting member securely holds the resilient mounting ring against movement and yet provides for support resiliently to allow for vibration absorption.

Still another object of the invention is to provide an improved motor mounting wherein a resilient mounting ring provided at each end of an electric motor is held between a pair of annularly arranged rims by a U-bolt positioned between the rims so that the resilient mounting member is retained between the rims and the U-bolt.

Further objects and advantages will become apparent from the drawings and the following description.

In the drawings:

Figure 4 is a vertical cross-sectional view taken along line 4—4 of Figure 1.

Figure 5 is a horizontal cross-sectional view taken along line 5—5 of Figure 4.

Figure 6 is an enlarged vertical cross-sectional view illustrating a part of the vertical mounting shown in Figure 1.

It is a conventional practice to use resilient rubber-like rings around opposite ends of an electric motor, which rings are mounted in a suitable mounting device for supporting an electric motor and for absorbing the vibration thereof. These rubber-like rings usually consist of a rubber ring disposed between inner and outer metal rings to which the rubber is vulcanized to form a mounting unit. This mounting unit is placed upon an axial extension of an electric motor housing which may form an end bell of the electric motor or be solely an extension of the housing. Various mechanical means have been provided for gripping the outer periphery of the mounting unit to thereby mount a motor resiliently upon a suitable base.

However, prior devices have not been wholly satisfactory because they did not hold the motor securely in the mounting member over prolonged periods of time, the motor and the mounting unit gradually working loose from the mechanical device holding the same.

It is therefore the purpose of this invention to provide a resilient motor mounting ring or mounting unit and a supporting device for the same which will secure the mounting unit upon the motor and will hold the fan motor in position without loosening of the mounting unit or the motor from the supporting device over a prolonged period of time.

Figure 1:
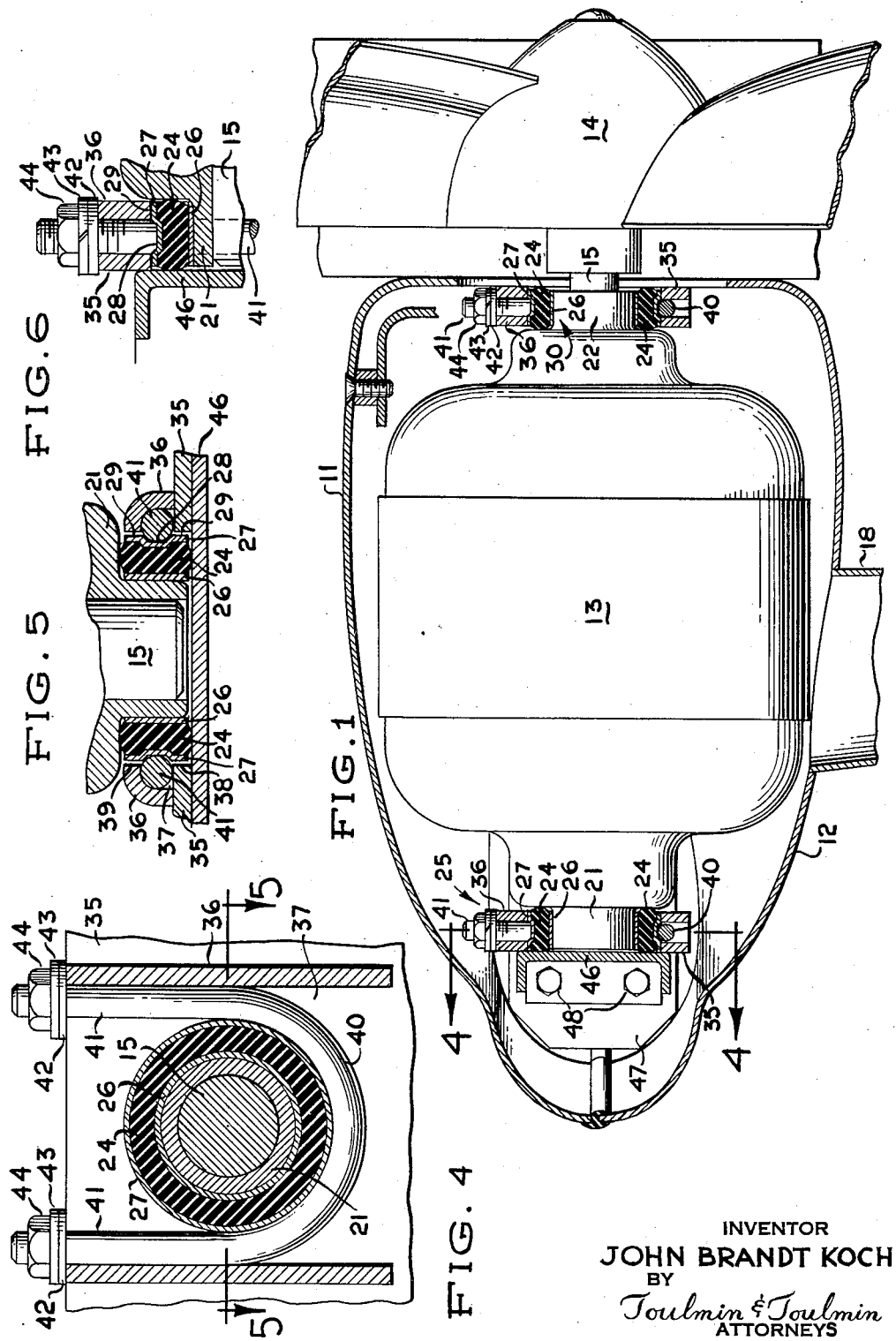
Figure 1 is a vertical cross-sectional view of an air ventilating fan illustrating the improved motor mounting device of this invention.
Figure 2:
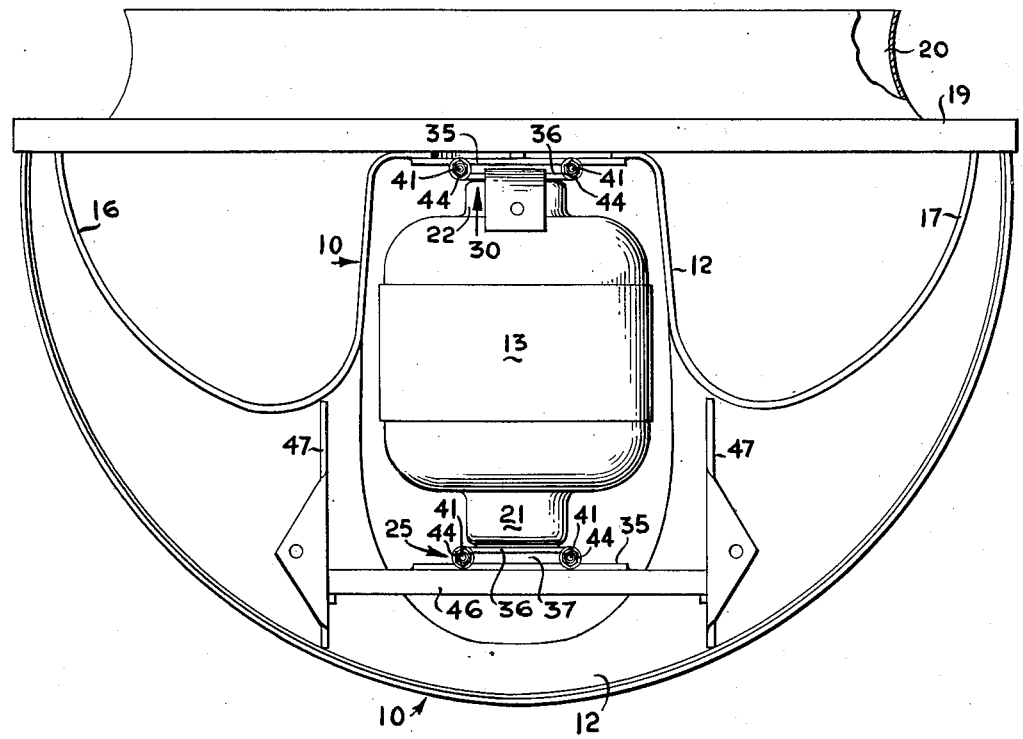
Figure 2 is a top plan view of the apparatus disclosed in Figure 1 but shown with the top half of the decorative cover removed.
Figure 3:
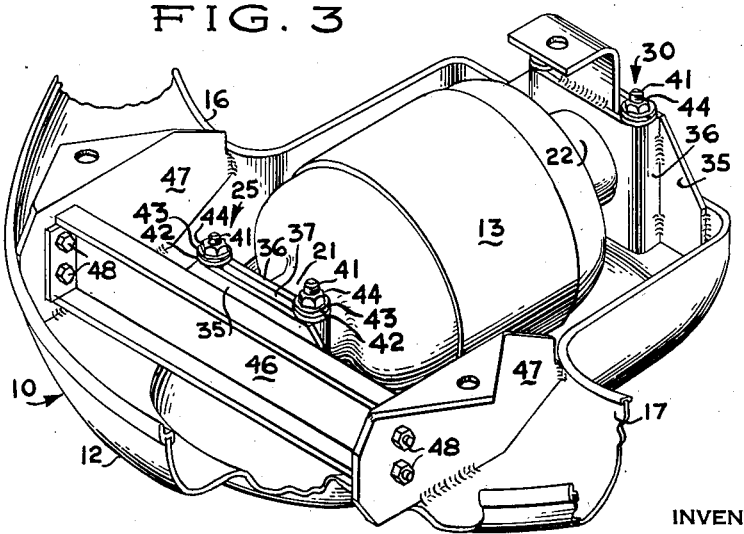
Figure 3 is a perspective elevational view illustrating a method of mounting a motor in a decorative shell.

In Figures 1, 2 and 3 there is illustrated a ventilating fan incorporating the motor mounting of this invention.

The ventilating fan consists of a hollow shell 10 having an upper shell half 11 and a lower shell half 12. The lower shell half 12 forms the mounting base for the electric motor 13 that drives the fan 14 carried upon the drive shaft 15 of the electric motor 13. The shell 10 is provided with three arms 16, 17 and 18 for mounting the shell upon a wall frame 19 which has the circular opening 20 in which the fan 14 rotates.

The electric motor 13 is provided with a motor mounting unit 25 at one end thereof and a similar cooperating motor mounting unit 30 at the opposite end thereof. The motor mounting units 25 and 30 are of like construction, hence a description of one will suffice for both.

As shown in Figure 1 the motor 13 is provided with an axial extension 21 at one end thereof which receives the motor mounting unit 25, a corresponding extension 22 being provided at the opposite end of the motor 13 to receive the mounting unit 30. The extensions 21 and 22 in this instance form the bearing sleeves for the drive shaft 15 of the electric motor 13.

The motor mounting units 25 and 30 each consist of a resilient mounting ring 24 constructed of rubber-like material that has an inner metal ring 26 and an outer metal ring 27 suitably vulcanized to the inner and outer peripheral surfaces of the rubber-like ring 24. The inner metal ring 26 is a snug fit upon the motor extension 21, and may even be a press fit thereon if desired. The outer metal ring 27 has an annular channel 28 around the same thereby forming annular ledges 29 around the ring 27.

The motor mounting for the resilient mounting ring 25 consists of a plate 35 to which there is secured a U-shaped plate 36, such as by a suitable welding operation along the juncture between the plates 35 and 36. The plate 36 being mounted upon a flat face of the plate 35 provides a space 37 between the plates. The plates 35 and 36 are each provided with openings 38 and 39 respectively in coaxial alignment. The ledges 29 adjacent opposite sides of the resilient ring 24 engage the openings 38 and 39, as illustrated in Figures 5 and 6. To secure the resilient ring 24 in position in the openings in the plates 35 and 36, a U-bolt 40 is placed in the space 37 and passes upwardly around the outer metal ring 27. The U-bolt 40 engages one half the periphery of the metal ring 27 and is received in the annular channel 28 between the ledges 29 of the ring 27.

The opposite legs 41 of the U-bolt 40 receive the washers 42, lock washers 43 and nuts 44 thereon. The nut 44 tightens the washer 42 against the upper horizontal edges of the plates 35 and 36 to draw the U-bolt 40 upwardly against the metal ring 27. When the U-bolt 40 draws the metal ring upwardly carrying the resilient rubber rim 24 therewith, the upper half of the ring 27 engages the upper half of the periphery of the openings 38 and 39 in the plates 35 and 36. The nuts 44 can be tightened as much as desired and the U-bolt 40 will cooperate with the openings 38 and 39 to clamp the resilient ring 24 around the entire periphery thereof, thus insuring a positive fastening between the motor mounting and the motor.

Also, when the U-bolts 40 are drawn upwardly the outer metal ring 27 will tend to compress the rubber-like ring 24 and increase the pressure upon the inner metal ring 26 to hold it tightly upon the extension 21 on the electric motor 13. The degree of tightening of the U-bolt upon the resilient ring 24 is unlimited, being limited only by the degree of compression capable in the rubber-like ring 24. Under extreme circumstances the resilient mounting ring 24 may even be slightly elongated, should such pressure become necessary at any time. The mounting is therefore fully adjustable at any time to increase the security with which the motor 13 is held in the motor mounting units 25 and 30 by merely tightening the nuts 44.

As shown in the drawings, the front mounting member 30 of the ventilating fan has the plate 35 thereof welded directly to the shell half 12. The rear motor mounting unit 25 has the plate 35 thereof welded to a channel bar 46 that is fastened to the vertical supporting members 47 by means of bolts 48. The members 47 are suitably welded to the shell half 12.

The motor 13 may be removed from the shell half 12 by first removing the channel bar 46 and the motor supporting unit 25 therewith so that the front motor mounting ring can be removed from between the mounting plates 35 and 36.

While the apparatus disclosed and described herein constitutes a preferred form of the invention, yet it will be understood that the apparatus is capable of mechanical alteration without departing from the spirit of the invention, and that all modifications that fall within the scope of the appended claims are intended to be included herein.

Having thus fully described my invention, what I claim as new and desire to secure by Letters Patent is:

1. A support for an electric motor including in combination, a resilent supporting member adapted for attachment upon an electric motor, a rigid supporting member having spaced substantially parallel walls, aligned openings in said walls receiving said resilient supporting member for supporting the same therein, and fastening means positioned between said walls and engaging said walls and said resilient supporting member to clamp said resilient supporting member between said fastening means and said walls.

2. A support for an electric motor including in combination, a resilient supporting member adapted for attachment upon an electric motor, a rigid supporting member having spaced substantially parallel walls, aligned openings in said walls receiving said resilient supporting member for supporting the same therein, and fastening means positioned between said walls engaging the same and partially encircling said resilient supporting member to clampingly retain said resilient supporting member between said fastening means and said walls.

3. A support for an electric motor including in combination, a resilient supporting member adapted for attachment upon an electric motor, a rigid supporting member having spaced substantially parallel walls, aligned openings in said walls receiving said resilient supporting member for supporting the same therein, and fastening means consisting of a U-strap positioned between said walls engaging the same and partially encircling said resilient supporting member to clampingly retain said resilient supporting member between said fastening means and said walls.

4. A support for an electric motor including in combination, a resilient supporting member adapted for attachment upon an electric motor, a rigid supporting member having spaced substantially parallel walls, aligned openings in said walls receiving said resilient supporting member for supporting the same therein, a U-strap positioned between said walls and partially encircling said resilient supporting member, and means on the ends of said U-strap engaging at least one of said walls for moving said U-strap relative thereto to clamp said resilient supporting member between said U-strap and said walls.

5. A support for an electric motor including in combination, a resilient supporting ring for receiving an extended part of an electric motor for supporting the same therein, a rigid supporting member having spaced substantially parallel walls, aligned openings in said walls receiving said ring for supporting the same therein, and fastening means positioned between said walls and engaging said walls and said ring to clamp said ring between said fastening means and said walls.

6. A support for an electric motor including in combination, a resilient supporting ring for receiving an extended part of an electric motor for supporting the same therein, a rigid supporting member having spaced substantially parallel walls, aligned openings in said walls receiving said ring for supporting the same therein, and fastening means positioned between said walls engaging the same and partially encircling said ring to clampingly retain said ring between said fastening means and said walls.

7. A support for an electric motor including in combination, a resilient supporting ring for receiving an extended part of an electric motor for supporting the same therein, a rigid supporting member having spaced substantially parallel walls, aligned openings in said walls receiving said ring for supporting the same therein, and fastening means consisting of a U-strap positioned between said walls engaging the same and partially encircling said ring to clampingly retain said ring between said fastening means and said walls.

8. A support for an electric motor including in combination, a resilient supporting ring for receiving an extended part of an electric motor for supporting the same therein, a rigid supporting member having spaced substantially parallel walls, aligned openings in said walls receiving said ring for supporting the same therein, a U-strap positioned between said walls and partially encircling said ring and means on the ends of said U-strap engaging at least one of said walls for moving said U-strap relative thereto to clamp said ring between said U-strap and said walls.

9. A support for an electric motor including in combination, a resilient supporting ring adapted to receive an extended part of an electric motor for supporting the same therein, a rigid supporting member having a substantially rectangular tubular transverse cross-sectional contour having aligned openings in opposite walls thereof receiving said ring and supporting the same therein, and fastening means positioned within said tubular member and engaging the same and partially encircling said ring positioned therein clampingly retaining said ring between said fastening means and the walls of said tubular member.

10. A support for an electric motor including in combination, a resilient supporting ring adapted to receive an extended part of an electric motor for supporting the same therein, a rigid supporting member having a substantially rectangular tubular transverse cross-sectional contour having aligned openings in opposite walls thereof receiving said ring and supporting the same therein, fastening means consisting of a U-strap positioned within said tubular member and partially encircling said ring, and means extending between said strap and said tubular member for moving the strap relative thereto to clamp said ring between said strap and the walls of said tubular member.

11. A motor mounting including in combination, a resilient supporting ring adapted to receive a part of an electric motor for supporting the same therein and having a substantially firm peripheral surface, a rigid mounting member having spaced substantially parallel walls, aligned openings in said walls to receive said resilient supporting ring therein for supporting the same upon said firm surface, and fastening means positioned between said walls and partially encircling said ring and engaging said walls for clampingly retaining said ring between said walls and said fastening means.

12. A support for an electric motor including in combination, a resilient supporting member adapted for attachment upon an electric motor, a pair of rigid support members arranged in spaced substantially parallel relationship, said members having aligned openings therein to receive said resilient supporting member, and fastening means positioned between said rigid support members and engaging said resilient support member for applying pressure thereon to secure said resilient support member between said fastening means and said rigid support members.

13. A support for an electric motor including in combination, a resilient supporting member adapted for attachment upon an electric motor, a pair of rigid support members arranged in spaced substantially parallel relationship, said members having aligned openings therein to receive said resilient supporting member, and fastening means positioned between said rigid support members engaging the same and said resilient support member and partially encircling the same to apply pressure thereon securing said resilient support member between said fastening means and said rigid support members.

14. A support for an electric motor including in combination, a resilient supporting member adapted for attachment upon an electric motor, a pair of rigid support members arranged in spaced substantially parallel relationship, said members having aligned openings therein to receive said resilient supporting member, and fastening means consisting of a U-bolt positioned between said rigid support members and partially encircling said resilient support member, said U-bolt having threaded members on the end thereof engaging said rigid support members to clamp said resilient support member between said U-bolt and said rigid support members.

15. A motor support including in combination, a resilient mounting member adapted for attachment to an electric motor and having a firm external peripheral surface, a pair of substantially rigid supporting members arranged in substantially parallel relationship, said rigid supporting members having aligned openings therein to receive said resilient supporting member and for supporting the same therein on said firm surface thereof, and fastening means extending between said resilient member and said rigid members to clamp said resilient member between said fastening means and said rigid members.

16. A motor support including in combination, a resilient mounting member adapted for attachment to an electric motor and having a firm external peripheral surface, a pair of substantially rigid supporting members arranged in substantially parallel relationship, said rigid supporting members having aligned openings therein to receive said resilient supporting member and for supporting the same therein on said firm surface thereof, and fastening means positioned between said rigid supporting members and said resilient supporting member and partially encircling the latter for clamping and retaining said resilient supporting member between said fastening member and said rigid supporting members.

17. A motor support including in combination, a resilient mounting ring adapted to receive a part of an electric motor for supporting the same therein, a pair of substantially rigid supporting members arranged in substantially parallel relationship, said rigid members having aligned openings therein receiving said resilient ring for supporting the same, and fastening means positioned between said rigid supporting members and extending between the same and said resilient supporting member clampingly securing said resilient supporting member between said fastening means and said rigid supporting members.

18. A motor support including in combination, a resilient mounting ring adapted to receive a part of an electric motor for supporting the same therein, a pair of substantially rigid supporting members arranged in substantially parallel relationship, said rigid members having aligned openings therein receiving said resilient ring for supporting the same, and fastening means consisting of a U-bolt positioned between said rigid supporting members and partially encircling said resilient supporting member and having threaded means thereon for moving said U-bolt relative to said rigid supporting members to clamp said resilient supporting member between said U-bolt and said rigid supporting members.

JOHN B. KOCH.

REFERENCES CITED

The following references are of record in the file of this patent:

UNITED STATES PATENTS

| Number | Name | Date |
|---|---|---|
| 2,096,139 | Spahr | Oct. 19, 1937 |
| 2,251,398 | Clark | Aug. 5, 1941 |
| 2,296,221 | Pontis | Sept. 15, 1942 |